(12) United States Patent
Birnbach (10) Patent No.: US 9,711,287 B2
(45) Date of Patent: Jul. 18, 2017

(54) HIGH VOLTAGE HIGH CURRENT VACUUM INTEGRATED CIRCUIT

(71) Applicant: Advanced Fusion Systems LLC, Newtown, CT (US)

(72) Inventor: Curtis A Birnbach, New Rochelle, NY (US)

(73) Assignee: Advanced Fusion Systems LLC, Newtown, CT (US)

(*) Notice: Subject to any disclaimer, the term of this patent is extended or adjusted under 35 U.S.C. 154(b) by 178 days.

(21) Appl. No.: 14/658,794

(22) Filed: Mar. 16, 2015

(65) Prior Publication Data

US 2015/0187531 A1 Jul. 2, 2015

Related U.S. Application Data (62) Division of application No. 13/253,877, filed on Oct. 5, 2011, now Pat. No. 9,025,353.

(Continued)

(51) Int. Cl.
*H01J 9/04* (2006.01)
*H01J 35/06* (2006.01)
*H01J 35/08* (2006.01)
*H01J 35/16* (2006.01)
*H01J 21/10* (2006.01)
*H05G 1/22* (2006.01)
*H01G 4/35* (2006.01)
*G05F 1/10* (2006.01)

(Continued)

(52) U.S. Cl.
CPC ............. *H01G 4/35* (2013.01); *G05F 1/10* (2013.01); *H01J 5/02* (2013.01); *H01J 7/16* (2013.01); *H01J 19/82* (2013.01); *H01J 21/10* (2013.01); *H02H 3/08* (2013.01); *H02H 9/02* (2013.01); *H02H 9/08* (2013.01); *H01J 19/24* (2013.01)

(58) Field of Classification Search
None
See application file for complete search history.

(56) References Cited

U.S. PATENT DOCUMENTS 2,021,103 A 11/1935 Kapteyn
2,190,504 A 2/1940 Sehlesinger
(Continued)

FOREIGN PATENT DOCUMENTS

GB 1173739 12/1969
GB 1255109 11/1971
(Continued)

OTHER PUBLICATIONS

Extended European Search Report for EP Application No. 16186926.8, dated Feb. 14, 2017.

*Primary Examiner* — Dedei K Hammond
(74) *Attorney, Agent, or Firm* — Bruzga & Associates; Charles E. Bruzga (57) ABSTRACT

A high voltage, high current vacuum integrated circuit includes a common vacuum enclosure that includes at least two cold-cathode field emission electron tubes, and contains at least one internal vacuum pumping means, at least one exhaust tubulation, vacuum-sealed electrically-insulated feedthroughs, and internal electrical insulation. The cold-cathode field emission electron tubes are configured to operate at high voltage and high current and interconnected with each other to implement a circuit function.

10 Claims, 6 Drawing Sheets

Related U.S. Application Data (60) Provisional application No. 61/406,792, filed on Oct. 26, 2010, provisional application No. 61/390,031, filed on Oct. 5, 2010.

(51) Int. Cl.

| | | |
|---|---|---|
| *H01J 5/02* | (2006.01) | |
| *H01J 7/16* | (2006.01) | |
| *H01J 19/82* | (2006.01) | |
| *H02H 9/02* | (2006.01) | |
| *H02H 3/08* | (2006.01) | |
| *H02H 9/08* | (2006.01) | |
| *H01J 19/24* | (2006.01) | |

(56) References Cited

U.S. PATENT DOCUMENTS

| | | |
|---|---|---|
| 3,753,168 A | 8/1973 | Schor |
| 4,594,630 A | 6/1986 | Rabinowitz et al. |
| 4,950,962 A | 8/1990 | Birnbach et al. |
| 4,979,076 A | 12/1990 | DiBugnara |
| 5,422,599 A | 6/1995 | Larsen |
| 6,429,044 B1 | 8/2002 | Tuttle |
| 2004/0079391 A1* | 4/2004 | Gindel .................. B08B 5/04 134/21 |
| 2006/0018085 A1 | 1/2006 | Kelly |
| 2006/0044847 A1 | 3/2006 | Baumgart et al. |
| 2008/0048626 A1 | 2/2008 | Kimura |
| 2008/0247105 A1 | 10/2008 | Divan |
| 2009/0190383 A1 | 7/2009 | Birnbach |
| 2009/0285362 A1 | 11/2009 | Birnbach |
| 2010/0097734 A1 | 4/2010 | Birnbach |
| 2010/0195256 A1 | 8/2010 | Birnbach |
| 2010/0195266 A1 | 8/2010 | Morita et al. |
| 2010/0289577 A1 | 11/2010 | Birnbach |

FOREIGN PATENT DOCUMENTS

| | | |
|---|---|---|
| GB | 1392262 | 4/1975 |
| JP | 06-260870 | 9/1994 |
| JP | 2000-090788 A | 3/2000 |
| JP | 2009076207 A * | 4/2009 |
| WO | 2010047890 A2 | 4/2010 |
| WO | 2010/134935 A1 | 11/2010 |
| WO | 2011028300 A1 | 3/2011 |

* cited by examiner

HIGH VOLTAGE HIGH CURRENT VACUUM INTEGRATED CIRCUIT

CROSS-REFERENCE TO RELATED APPLICATIONS

This application is a divisional application of U.S. patent application Ser. No. 13/253,877 filed Oct. 5, 2011 for High Voltage High Current Regulator, claiming priority to U.S. Provisional Application No. 61/390,031 filed Oct. 5, 2010 for High Voltage AC Current Regulator by Curtis A. Birnbach, and to U.S. Provisional Patent Application No. 61/406,792 filed Oct. 26, 2010 for High Voltage High Current Regulator by Curtis A. Birnbach, the contents of each of which is herein incorporated by reference. This application is also related to two prior applications by the current inventor, U.S. application Ser. No. 12/359,198, filed 23 Jan. 2009, entitled High Voltage Inverter; and U.S. application Ser. No. 12/554,818, filed 4 Sep. 2009, entitled Method and Apparatus For Protecting Power Systems From Extraordinary Electromagnetic Pulses.

FIELD OF THE INVENTION

The present invention relates to a high voltage, high current vacuum integrated circuit.

BACKGROUND OF THE INVENTION

The prior art practice of manufacturing multiple cold-cathode field emission electron tubes is to house each cold-cathode field emission electron tube in a separate vacuum housing. It would be desirable to reduce the cost of installation of cold-cathode field emission tubes and to increase reliability of a system incorporating such cold-cathode field emission tubes.

BRIEF SUMMARY OF THE INVENTION

In a preferred embodiment, a high voltage high current vacuum integrated circuit comprises a common vacuum enclosure. The vacuum enclosure contains (1) at least one internal vacuum pumping means; (2) at least one exhaust tubulation for evacuating the vacuum enclosure and subsequently sealing and separating the vacuum enclosure from at least one external vacuum pump; (3) vacuum-sealed electrically-insulated feedthroughs passing electrical conductors from outside the vacuum enclosure to inside the enclosure while electrically insulating the electrical conductors from the vacuum enclosure and maintaining the vacuum seal; (4) internal electrical insulation for minimizing the overall size requirement for the vacuum enclosure, and preventing internal electrical short circuits; and (5) at least two cold-cathode field emission electron tubes within the vacuum enclosure which are configured to operate at high voltage and high current and which are interconnected with each other to implement a circuit function.

The foregoing high voltage high current vacuum integrated circuit increases system reliability and simplifies installation into a system as compared to the prior art practice of housing of each cold-cathode field emission electron tube in a separate vacuum housing.

BRIEF DESCRIPTION OF THE DRAWINGS

Further features and advantages of the invention will become apparent when reading the following detailed description of the invention in conjunction with the drawing figures, in which.

DETAILED DESCRIPTION OF THE INVENTION

A list of reference numerals and associated parts appears near the end of this detailed description.

The following definitions relate to terms that used herein.

DEFINITIONS

"High current" means herein greater than 50 Amps.
"High voltage" means herein greater than 400 Volts AC.

High Voltage High Current Vacuum Integrated Circuit

As conceived by the present inventor, as is the case in the semiconductor industry, integration of circuit function would be advantageous with high voltage high current vacuum tube circuits. In the case of electron tube circuits, integration provides a way to provide functional blocks of circuitry as opposed to discrete components, but is distinguished from semiconductor integrated circuits due to often vastly different voltage and current operating regimes, as well as totally different physical manifestations and operating principles.

Figure 1:
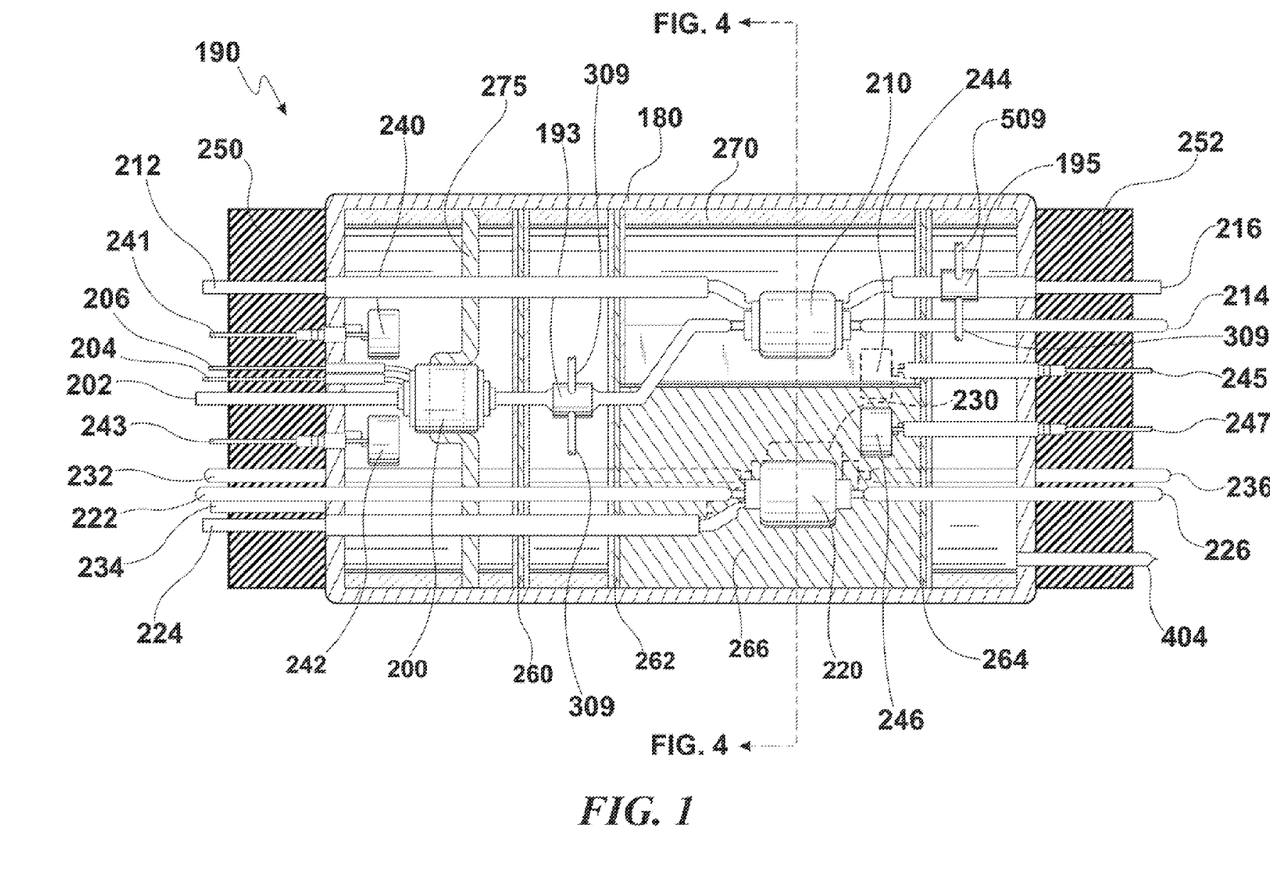
FIG. 1 is a simplified, longitudinal, cross-sectional view through the central axis of a high voltage high current vacuum integrated circuit, modified to show internal components in the foreground.

Referring to FIG. 1 of the published parent application, the high voltage current regulator circuit 10 of FIG. 1 of such application is implemented, in one embodiment, as three separate tubes which are interconnected in a circuit. Such tubes are shown, for instance in FIGS. 6E, 12 and 13 of Pub. No. US 2010/0195256 A1 dated Aug. 5, 2010, entitled Method and Apparatus for Protecting Power Systems from Extraordinary Electromagnetic Pulses, now U.S. Pat. No. 8,300,378 B2. The "published parent application" means U.S. Patent Publication No. 2012/0081097 A1 dated Apr. 5, 2012, entitled "High Voltage High Current Regulator.". In contrast, as shown in FIG. 1 herein, a preferred embodiment incorporates at least the cold-cathode field emission electron tubes of FIG. 1 or FIG. 7 of the published parent application into a single stainless steel vacuum enclosure 180 of circular cross-section along its length, or horizontal direction as shown in FIG. 1, so as to form a high voltage high current vacuum integrated circuit (HVHC VIC).

With reference to FIG. 7 of the published parent application, in addition to placing electron tubes 140, 23, 35 and 1135 into common vacuum enclosure 180 (FIG. 1), the enclosure 180 may also house low pass filters 160 and 170, for instance. Since it is difficult to repair electrical components within the vacuum enclosure 180, it is usually best practice to house only vacuum-tolerant and reliable electrical components within the enclosure. This practice may indicate that some or all of the associated resistors and capacitors shown in FIG. 7 of the published parent application should be located external to the vacuum enclosure.

Correspondence between parts within vacuum enclosure 180 of FIG. 1 and the circuit of FIG. 7 of the published parent application are as follows:

| Parts in FIG. 1 | Circuit of FIG. 7 of the published parent application |
| --- | --- |
| Bi-tron tube 200 | Bi-tron tube 144 |
| Bi-tron tube 210 | Bi-tron tube 23 |
| Pulsatron tube 220 or 230 | Pulsatron tube 35 |
| Pulsatron tube 230 or 220 | Pulsatron tube 1135 |
| Low pass filter 193 | Low pass filter 160 |
| Low pass filter 195 | Low pass filter 170 |

Figure 2:
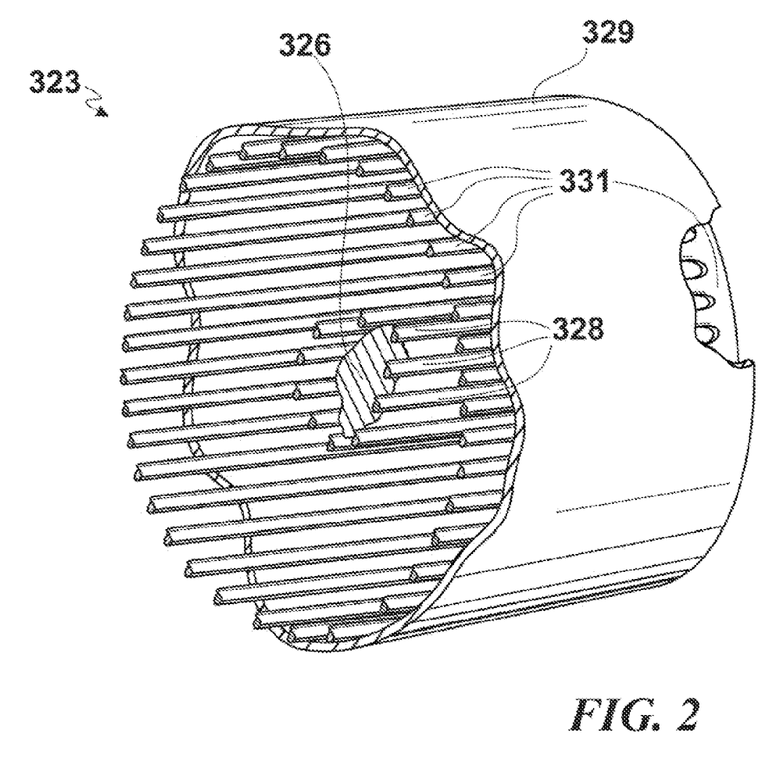
FIG. 2 is a simplified perspective view, partially cut away, of a bidirectional cold-cathode field emission tetrode tube, or Bi-tron tube, that may be used in the current regulator of FIG. 1.

FIG. 2 shows a Bi-tron tube 323. Bi-tron tube 323 includes an inner "cathanode" 26, by which is meant a main current-carrying conductor that alternately functions as a cathode and an anode. Cathanode 326 is cylindrically shaped, and may be in the form of a cylindrical solid as shown. A second cathanode 329, of cylindrical shape, surrounds cathanode 326 and shares the same longitudinal axis (not shown). A cylindrically shaped grid 328 surrounds cathanode 326, is adjacent to, and associated with, such cathanode. A cylindrically shaped grid 331 is enclosed by cathanode 329 and is adjacent to, and associated with, such cathanode.

Further details of Bi-tron tubes can be found in Pub. No. US2010/0195256 A1 dated Aug. 5, 2010, entitled "Method and Apparatus for Protecting Power Systems from Extraordinary Electromagnetic Pulses," now U.S. Pat. No. 8,300,378 B2.

A Pulsatron tube is a cold-cathode field emission tube, having an anode, a cathode and a grid adjacent to, and associated with such cathode. In an actual embodiment, the anode, cathode and grid are cylindrically shaped. Further details of a Pulsation tube are found in U.S. Pat. No. 4,950,962, issued Aug. 21, 1990, entitled High Voltage Switch Tube.

Referring back to FIG. 1, vacuum enclosure 180 also includes conventional chemical getter pumps 240, 242, 244 and 246, which are shown mounted on conventional vacuum-sealed, electrically insulated feedthroughs 241, 243, 245 and 247, respectively. Although not shown, preferably, the getter pumps 240, 242, 244 and 246 are mounted on one or more internal electrical buses, that are, in turn, connected to one or more conventional vacuum-sealed, electrically insulated feedthroughs. In addition to chemical getter pumps, or as an alternative to chemical getter pumps, electric vacuum pumps (not shown) within or external to the vacuum enclosure 180, could be used. The capacity of, and number of, vacuum pumps that will be required for any particular vacuum enclosure is a routine determination to those of ordinary skill in the art.

Other electrical leads are brought out from vacuum enclosure 180 from other electrical components within the enclosure, so as to enable electrical connections to external circuitry and to external resistors, capacitors or other electrical components such as those shown in FIG. 7 of the published parent application. The connections can be conventional vacuum sealed, electrically insulated feedthroughs 202, 204 and 206 for Bi-tron tube 200, the same type of feedthroughs 212, 214 and 216 for Bi-tron tube 210, the same type of feedthroughs 222, 224 and 226 for Pulsatron tube 220, and the same type of feedthroughs 232, 236 and 236 for Pulsatron tube 230. Alternatively, if flexible leads are desired, as compared to the usually rigid vacuum sealed, electrically insulated feedthroughs just mentioned, then conventional flexible "flying leads" can be used to allow external connection to the electrodes of the electron tubes or other electrical components within the vacuum enclosure 180.

The various electrical components in vacuum enclosure 180 may be arranged in many different manners. A preferred approach is to have Bi-trons 200 and 210 aligned with each other along their respective longitudinal axes, rather than to be offset from each other as shown in FIG. 1 of the published parent application. A further variation is to use more than one HVHC VIC, each having its own vacuum enclosure for housing fewer than all the parts shown in the circuit of FIG. 7 of the published parent application, for example, which may afford more flexibility in the overall dimensions of all aggregate circuit components.

FIG. 1 shows the optional, preferred use electrical potting compound 250 and 252 to provide electrical insulation between conductors of conventional high vacuum electrical feedthroughs in transition regions where electrical leads emerge from the vacuum enclosure 180. Such potting compounds may be selected from various rubbers and other elastomers, plastics, and ceramics, with ceramics being preferred for highest temperature use. When using the alternative of "flying leads," as mentioned above, the use of potting compound is strongly preferred.

Figure 3:
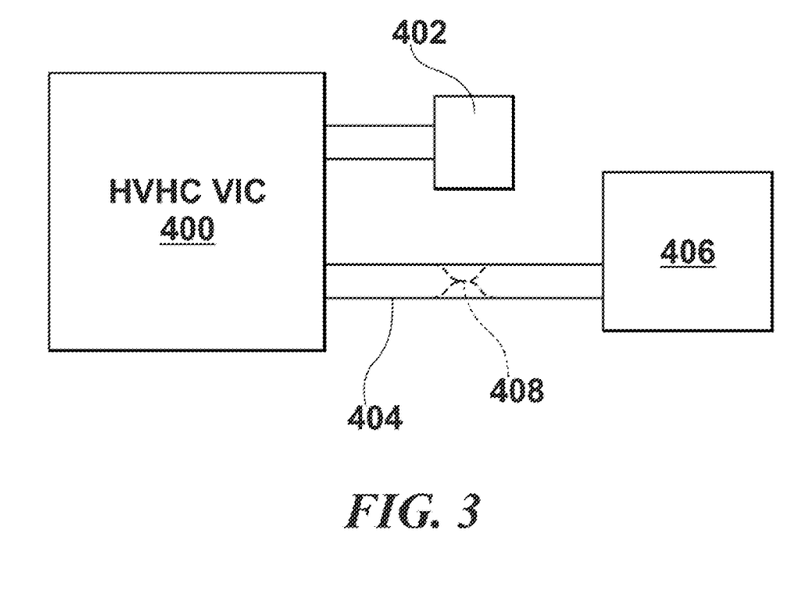
FIG. 3 is a block diagram of an HVHC VIC and various external vacuum pumps.

FIG. 3 shows a HVHC VIC 400, such as shown in FIG. 1, connected to an external vacuum pump 402, whose purpose is to maintain the necessary high vacuum within HVHC VIC 400 during operation.

FIG. 3 also shows HVHC VIC 400 connected to a large, external vacuum pumping system 406, whose purpose is to evacuate HVHC VIC 400 during manufacturing, by an exhaust tubulation 404. The exhaust tubulation 404 is typically a short length of metal pipe. At the conclusion of the evacuation process, the exhaust tubulation 404 is "pinched off" by a tool (not shown) to provide a robust vacuum seal for both the HVHC VIC 400 and the external vacuum pumping system 406, as will be routine to persons of ordinary skill from the present specification.

Referring back to the HVHC VIC 190 of FIG. 1, a pinched-off exhaust tubulation 404 is shown in the lower right corner of the drawing.

Multiple Circuit Functions Implemented in HVHC VIC

As the foregoing makes clear, multiple electrical components housed within common vacuum enclosure enable multiple circuit functions within HVHC VIC 190 of FIG. 1. The various electrical connections from electrical components internal to vacuum enclosure 180 to external circuitry or electrical components allows a single, multiple tube HVHC VIC to address differing requirements by only changing the external electrical components.

The vacuum enclosure 180 of FIG. 1 also typically includes various electrically insulating mechanical support structures, such as internal magnetic shields 260, 262, 264 and 266, discussed in detail below, and electrical grounding support 275 for Bi-tron 200. Grounding support 275 is typically provided with vent openings (not shown) for the purpose of improving vacuum conductance and providing pressure equalization within the vacuum enclosure 180. Enclosure 180 also typically contains many ceramic insulators, such as cylindrically shaped insulator 270, just within vacuum enclosure 180. FIG. 2 omits various electrically insulating mechanical support structures and ceramic insulators for clarity of illustration; use of such support structures and insulators will be routine to those of ordinary skill in the art.

Benefits of High Voltage High Current Vacuum Integrated Circuit

By incorporating multiple cold-cathode field emission electron tubes and, preferably, other electrical components within common vacuum enclosure 130, in a HVHC VIC 190, installation of the circuitry housed within the enclosure is simplified, and typically requires less space from installation. This reduces the cost of installation, and increases system reliability by reduction of the mean time between failures for the present HVHC VIC.

By implementing multiple circuit functions in the same vacuum enclosure, the present HVHC VIC is somewhat similar to semiconductor circuits. However, the motivation for a HVHC VIC is significantly different from that of a semiconductor integrated circuit (IC). In a semiconductor IC, the primary reason for integration is to increase circuit density. In a VIC, the primary motivation is to increase reliability and simplify installation into a system. HVHC VIC's are primarily intended for use in high voltage, high current, high power electronics circuits, a field in which semiconductors are not able to operate. Similarly, HVHC VIC's are not practical to manufacture for voltages below 400 volts. Below 400 volts, semiconductor devices are more practical. At substantially above 400 volts, semiconductors become progressively less useful as the voltage and current requirements of the circuit increase. By 26,000 Volts, there are no single semiconductor devices known. In comparison, cold-cathode field emission electron tubes within a HVHC VIC can operate at considerably higher voltages, including voltages of 1.2 million Volts and higher, and at simultaneous currents in the hundreds to thousands of MegaAmperes. Further, the very high arc resistance of electron tubes and their superior thermal performance make electron tubes appropriate for integration into a HVHC VIC.

The claimed invention implements sophisticated circuit functions, responding to different external conditions with different response modes, as previously described.

Definitions Concerning Magnetic Shields

The following two sections on Internal Magnetic Shielding and External Magnetic Shielding use the following, various terms that have the following meaning herein:

"Magnetic shield" means a structure including magnetic shielding material formed either (1) fully from magnetic shielding metal, or (2) as a mixture of magnetic shielding metal and non-magnetic material, such as electrically insulating ceramic. A magnetic shield may be covered with electrically insulating material to prevent arcing from high voltages.

"Magnetic insulation" is used interchangeably with the "magnetic shielding material" as defined in the foregoing definition of "magnetic shield."

"Electrical insulation" means dielectric material such as an electrically insulating ceramic.

"Electrical and magnetic insulation" means a combination of the foregoing-defined "electrical insulation" and "magnetic insulation."

Variants of the foregoing terms, such as "magnetically insulating" and "electrically insulating" have similar meanings as found in the foregoing definitions.

As used herein, "vacuum-grade" refers to materials that do not exhibit the property of outgassing; that is, the property of gasses being released from interstitial spaces within the atomic or molecular structure of such material in the presence of reduced pressure and temperature or both reduced pressure and temperature.

"Thin" magnetic material is defined herein as a material where the absolute value of its surface area is substantially greater than the absolute value of its thickness.

External Magnetic Shielding

In designing a HVHC VIC, the adverse impact of external magnetic fields should be considered, to make sure that any such external fields do not adversely affect the performance of electrical components within the HVHC VIC. In this connection, the vacuum enclosure 180 (FIG. 1) can be formed from high-permeability magnetic shielding metal (not shown), or a liner (not shown) of such material can be interposed between the metallic vacuum enclosure 180 and the ceramic insulator 270 just inside enclosure 180. For enhanced magnetic shielding, multiple layers (not shown) of alternating high permeability and low permeability magnetic shielding metals can be used; and for still more enhanced magnetic shielding, electrically and magnetically insulating dielectric material (not shown) can be interposed between the foregoing alternating layers. Enhanced magnetic shielding may also be attained by interposing the foregoing type of dielectric material between layers of material having the same permeability, for instance. The selection of any foregoing techniques, and others, for providing shielding of electrical components within an HVHC VIC from external magnetic fields will be routine to persons of ordinary skill in the art based on the present specification.

Internal Magnetic Shielding

A design consideration for a HVHC VIC 190 of FIG. 1, for example, is whether the magnetic fields produced by electrical components within common vacuum enclosure 180, which may be in relatively close proximity to each other, adversely affects operation of other electrical components within such enclosure. Sources for strong magnetic fields may arise from, for instance:

Electron tubes within the vacuum enclosure 180 (FIG. 1) may typically have high energy electron beams that create strong magnetic fields while passing through the interelectrode spaces of the electron tube. If such magnetic fields are sufficiently strong, such fields can distort the trajectories and overall symmetry of electron beams within adjacent electron tubes within the enclosure 180.

When low pass filters 193 and 195 within vacuum enclosure 180 are of the ferrite type, such filters can, under some circumstances, also produce substantial magnetic fields that can distort the trajectories and overall symmetry of electron beams within adjacent electron tubes in the enclosure.

To address the foregoing problem of adversely high magnetic fields within the vacuum enclosure 180, the magnetic shields 260, 262, 264 and 266 can be used to separate electrical components within vacuum enclosure 180 from one or more other components. The number, geometry, and composition of magnetic shields such as 260, 262, 264 and 266 depend on the specific configuration of a desired HVHC VIC, and in particular the spacing interrelationships between internal magnetic field-producing components and internal electron tubes or other components whose operation could be adversely affected by internal magnetic fields.

Placing a magnetic shield including magnetic shielding metal in the common vacuum enclosure 180 (FIG. 1) with cold-cathode field emission tubes 200, 210, 220 and 230, that can be configured to operate at high voltage, potentially raises the undesirable problem of internal electrical arcing and component failure. Thus, it is desirable to electrically insulate the magnetic shields by encapsulating them in an electrical insulator such as electrically insulating ceramic or other refractory material of appropriate dielectric strength and thickness. For simplicity of explanation for the remainder of this section entitled internal Magnetic Shielding, the reference to "ceramic" is intended to mean "ceramic" as well as alternatives to ceramic.

Figure 4:
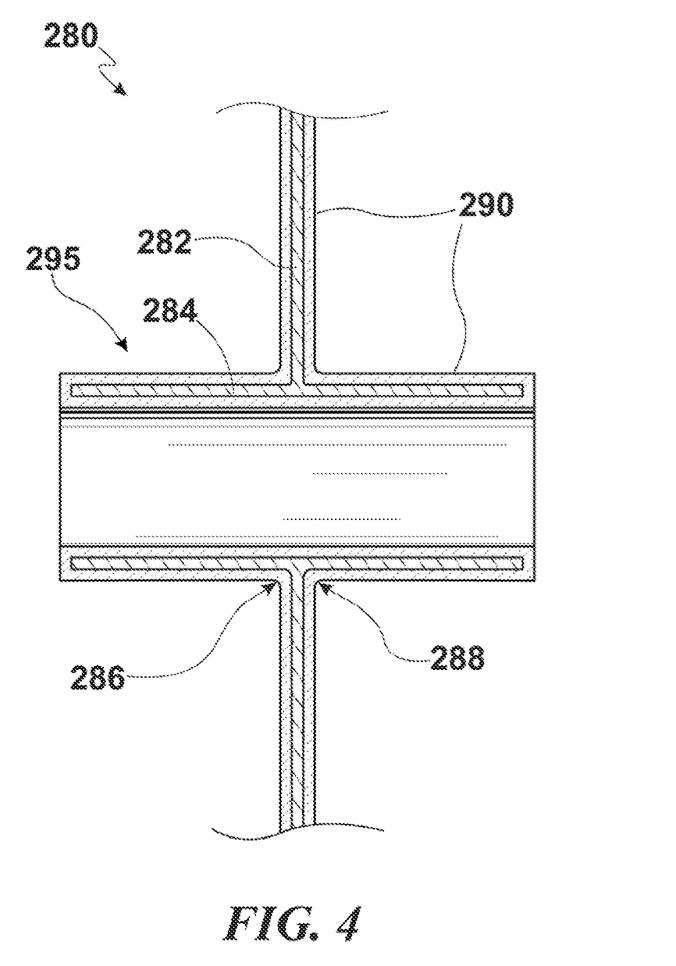
FIG. 4 is a cross-sectional side view of a portion of a magnetic shield having a penetration for equalizing vacuum on both sides of the shield.
Figure 5:
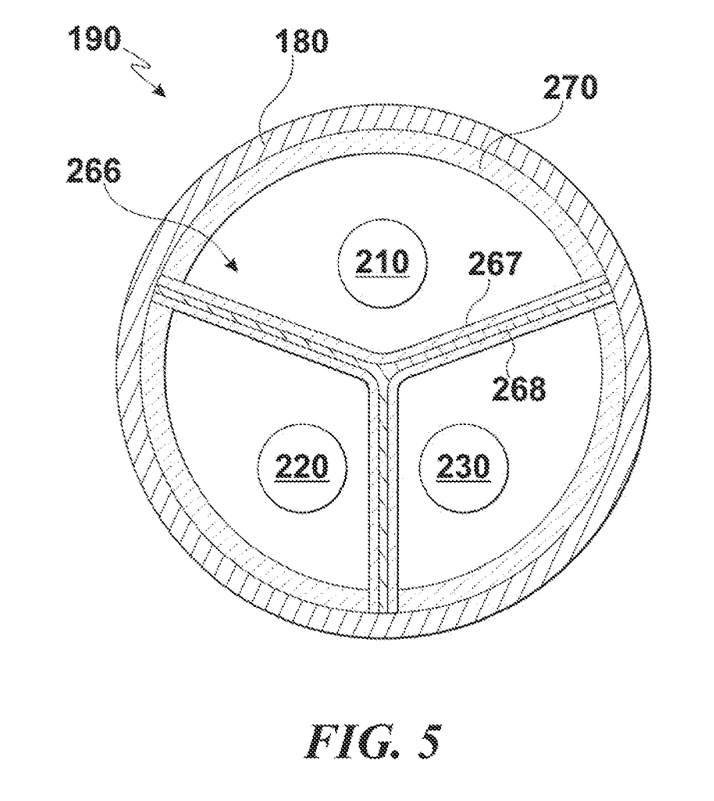
FIG. 5 is an enlarged, simplified cross-sectional view taken at the arrows marked FIG. 4, FIG. 4 in FIG. 1.

Thus, FIG. 4 shows a portion of a magnetic shield 280, having vertically extending high permeability magnetic shielding metal 282 and a tubular shaped high permeability magnetic shielding metal 284, preferably joined together at locations 286 and 288 by welding and annealing, and then encapsulated in an electrically insulating ceramic 290. Preferably, in each location 286 and 288, the ceramic 290 is formed as a fillet for purposes of reducing stress due to a concentration of the electric field.

The resulting hollow, magnetically shielded tube 295 provides venting and pressure equalization within the vacuum enclosure 180 (FIG. 1), and would be located preferably close to chemical getter vacuum pumps for optimal vacuum pumping. Magnetically shielded tube 295 preferably has an aspect ratio defined by the ratio of its internal diameter to its length being one to four or greater. This aspect ratio arises from the way in which magnetic field lines flow around an aperture in a tubular structure. By maintaining this ratio, the magnetic shielding properties of the shield wall, through which the tube passes, are maintained. One or more magnetically shielded tubes 295 are required to assure uniform vacuum within vacuum enclosure 180 as shown in FIG. 1, although they are not shown in FIG. 1 for simplicity.

Magnetic shielding metal 282 and 284 is preferably all metal, but could instead be formed of a mixture of high concentration, finely divided magnetic shielding metal in high concentration with an electrically insulating ceramic, which is then molded into a desired shape, encapsulated in electrically insulating ceramic 290, and then fired to sinter and harden the ceramics. Preferably, the initial finely divided ceramic particles and the encapsulating ceramic have the same chemical composition, to minimize thermal expansion mismatch. In all of the above ceramic-encapsulating scenarios, the firing of the outer ceramic and, optionally of any interior composite ceramic and magnetic material preferably performs the additional function of annealing the magnetic shield metal to develop its full shielding potential.

The above description of external magnetic shielding, under the prior heading "External Magnetic Shielding," includes variations from using a single layer of high permeability magnetic shielding metal for magnetic shielding. Such variations apply as well to internal magnetic shielding, so that the high permeability magnetic shielding metals 282 and 284 of FIG. 4 could be replaced with alternating layers of high permeability and low permeability magnetic shielding metals, by way of example. The selection of appropriate magnetic shielding metals will be routine to those of ordinary skill in the art based on the present specification. FIG. 4 shows a better view of magnetic shield 266 of FIG. 1, which has a Y-shape in cross section, which may be an electrical insulator such as electrically insulating ceramic 267 over magnetic shielding metal 268 such as pure or mixed magnetic metal, similar to magnetic shield 280 in FIG. 4 as described above. Preferably, the magnetic shielding metal 268 is attached to vacuum enclosure 180 by welding when the vacuum enclosure is stainless steel or other electrically conductive metal, and, as shown in FIG. 1, is also attached to the magnetic shielding material of the adjacent magnetic shields 262 and 264. Similarly, in FIG. 1, the inner magnetic shielding material for magnetic shields 260, 262 and 264, shown with metal cross-hatching are welded to the vacuum enclosure 180 when the vacuum enclosure is stainless steel or other electrically conductive metal.

Bi-tron tube 210 and Pulsatron tubes 220 and 230 are shown as simple circles, and many other structures are omitted for clarity. FIGS. 1 and 4 thus show that each of Bi-tron tubes 200 and 210, Pulsatron tubes 220 and 230, and low pass filters 193 and 195 are separated from each other by associated electrically and magnetically insulated shields 260, 262, 264 and 266, and each may be considered to be in its own internally electrically and magnetically insulated compartment. Of course, more than one internal electrical component can exist in the same internally electrically and magnetically insulated or electrically insulated compartment if the magnetic field from one component does not adversely affect operation of the other components, and so forth.

It is desirable to have chemical getter vacuum pumps in any compartment or region of the vacuum enclosure 180 (FIG. 1) that contains an electron tube or tubes. This maximizes the conductance, and hence, efficiency of the chemical getter pumps from the perspective of such electron tubes. It is possible to minimize the number of getter pumps by providing electrically and magnetically insulated tubes 295 (FIG. 4) which provide improved vacuum conductance-and-pressure equalization orifices between compartments, provided that this can be accomplished without compromising the electrical and magnetic insulation properties of the shields or separators between compartments.

As presently shown in FIG. 1, low pass filters 193 and 195 are shielded from other electrical components within vacuum enclosure 180 of HVHC VIC 190 of FIG. 1 by magnetic shields 260, 262 and 264. An alternative or additional way of magnetically shielding low pass filters 193 and 195 is now described in connection with FIG. 6.

Figure 6:
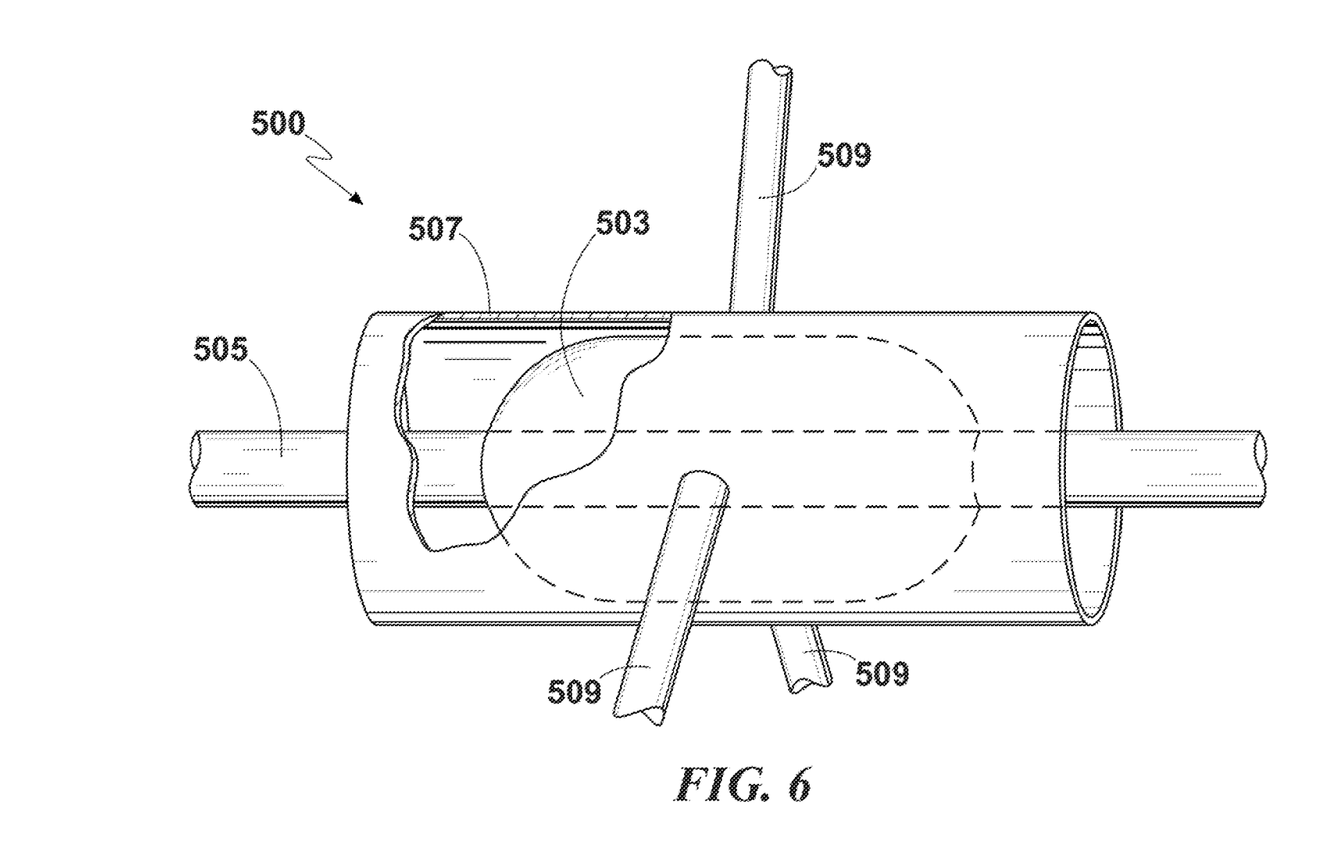
FIG. 6 is a perspective view, partially cutaway, of a ferrite low pass filter having an integrated capacitor that may be used in the high voltage high current vacuum integrated circuit of FIG. 1.

FIG. 6 shows a preferred construction of a combined low pass filter 500. A ferrite filter sleeve 503 is placed on a conductor 505, and forms the inner plate of a bypass capacitor, as well as providing a blocking function for high frequency signals. An outer tubular electrode 507 forms the outer plate of the bypass capacitor. A respective low pass filter 500 provides the filtering described above for each of low pass filters 160 and 170 of FIG. 7 of the published parent application. Additional or alternative RF filtering components (not shown) may be incorporated in the vicinity of the illustrated low pass filters 193 and 195 in FIG. 1, which implement low pass filters 160 and 170 of FIG. 7 of the published parent application, respectively.

Low pass filter 500 includes grounding spokes 509. Although not shown in the figures, grounding spokes 509 can attach to the vacuum enclosure 180 (FIG. 1) or another grounded structure, preferably in such a way as to beneficially provide both electrical grounding and mechanical support for low pass filter 500.

In regard to an alternative, or additional, way of magnetically shielding low pass filters 193 and 195 (FIG. 1), outer tubular electrode 507 can be formed of magnetic shielding metal, such as mu metal. In such embodiment, the low pass filter 500 acts to magnetically shield other electrical components within vacuum enclosure 180 (FIG. 1) from magnetic fields generated by low pass filters 193 and 195. In this connection, the right and left-shown ends of the outer tubular electrode 507 should each extend beyond ferrite filter sleeve 503 so as to restrict the angle of emission of magnetic fields from within outer tubular electrode 507.

Additional Benefits of Internal Magnetic Shields

In addition to providing electrical and magnetic insulation, magnetic shields 260, 262 and 264 in FIG. 1 provide significant mechanical support to various internal electrical components. For instance, various of the electrically insulated feedthroughs, such as 212 and 214, through various of the electrically insulated magnetic shields, e.g., 260, 262 and 264, and are advantageously mechanically supported by such shields.

The following is a list of reference numerals and associated parts as used in this specification and drawings:

| Reference Numeral | Part |
|---|---|
| 180 | Vacuum enclosure |
| 190 | High voltage high current vacuum integrated circuit |
| 193 | Low pass filter |
| 195 | Low pass filter |
| 200 | Cold-cathode field emission election tube, or Bi-tron tube |
| 202 | Electrically insulated feedthrough |
| 204 | Electrically insulated feedthrough |
| 206 | Electrically insulated feedthrough |
| 210 | Cold-cathode field emission election tube, or Bi-tron tube |
| 212 | Electrically insulated feedthrough |
| 214 | Electrically insulated feedthrough |
| 216 | Electrically insulated feedthrough |
| 220 | Cold-cathode field emission election tube, or Pulsatron |
| 222 | Electrically insulated feedthrough |
| 224 | Electrically insulated feedthrough |
| 226 | Electrically insulated feedthrough |
| 230 | Cold-cathode field emission election tube, or Pulsatron |
| 232 | Electrically insulated feedthrough |
| 234 | Electrically insulated feedthrough |
| 236 | Electrically insulated feedthrough |
| 240 | Chemical getter pump |
| 241 | Electrically insulated feedthrough |
| 242 | Chemical getter pump |
| 243 | Electrically insulated feedthrough |
| 244 | Chemical getter pump |
| 245 | Electrically insulated feedthrough |
| 246 | Chemical getter pump |
| 247 | Electrically insulated feedthrough |
| 250 | Potting compound |
| 252 | Potting compound |
| 260 | Magnetic shield |
| 262 | Magnetic shield |
| 264 | Magnetic shield |
| 266 | Magnetic shield |
| 267 | Ceramic |
| 268 | High permeability magnetic shielding metal |
| 270 | Ceramic insulator |
| 275 | Grounding support |
| 280 | Magnetic shield |
| 282 | High permeability magnetic shielding metal |
| 284 | High permeability magnetic shielding metal |
| 286 | Location |//

| Reference Numeral | Part |
|---|---|
| 288 | Location |
| 290 | Ceramic |
| 295 | Magnetically shielded tube |
| 300 | Low pass filter |
| 303 | Ferrite filter sleeve |
| 305 | Conductor |
| 307 | Outer tubular electrode |
| 323 | Bi-tron Tube |
| 326 | Cathanode |
| 328 | Grid |
| 329 | Cathanode |
| 331 | Grid |
| 405 | Pinched-off exhaust tabulation |
| 406 | Exhausting vacuum pumping system |
| 408 | Location of pinch-off |
| 500 | Low pass filter |
| 503 | Ferrite filter sleeve |
| 505 | Conductor |
| 507 | Outer tubular electrode |
| 509 | Grounding spokes |

While the invention has been described with respect to specific embodiments by way of illustration, many modifications and changes will occur to those skilled in the art. For instance, whereas cylindrical electrode geometry is preferred for the various electron tubes described herein, similar or the same as the geometry shown in FIG. 2 of the published parent application, electron tubes having other geometries, such as planar, arcuate or spherical, by way of example, may be used. It is, therefore, to be understood that the claims are intended to cover all such modifications and changes as fall within the true scope and spirit of the invention.

What is claimed is:

1. A high voltage high current vacuum integrated circuit, comprising a common vacuum enclosure for containing a common vacuum environment, the common vacuum environment containing:
 a) at least one internal vacuum pumping means;
 b) at least one exhaust tubulation for evacuating said vacuum enclosure and subsequently sealing and separating said vacuum enclosure from at least one external vacuum pump;
 c) vacuum-sealed electrically-insulated feedthroughs passing electrical conductors from outside the vacuum enclosure to inside the enclosure while electrically insulating the electrical conductors from the vacuum enclosure and maintaining the vacuum seal;
 d) internal electrical insulation for preventing internal electrical short circuits; and
 e) at least two cold-cathode field emission electron tubes, whose respective vacuum environments are part of said common vacuum environment; said electron tubes being configured to operate at high voltage and high current and being interconnected with each other to implement a circuit function.

2. The vacuum integrated circuit of claim 1, wherein, for preventing deleterious interference with the respective electron beams within said electron tubes arising from magnetic fields external to the vacuum enclosure, the vacuum enclosure is formed from high-permeability magnetic shielding metal or includes a liner of high-permeability magnetic shielding metal.

3. The vacuum integrated circuit of claim 1, wherein the vacuum enclosure is provided with one or more internal magnetic shields for preventing deleterious interference within said electron tubes from magnetic fields produced by one or more of said electron tubes or from other electrical components within said vacuum enclosure.

4. The vacuum integrated circuit of claim 3, wherein the one or more internal magnetic shields are electrically insulated by having portions of said shields covered by respective electrically insulating materials.

5. The vacuum integrated circuit of claim 3, wherein the one or more internal magnetic shields provide mechanical support to one or more physical elements within said vacuum enclosure.

6. A combination of the vacuum integrated circuit of claim 1 and an external vacuum pumping means that is connected to the vacuum integrated circuit, for maintaining vacuum level during operation.

7. The vacuum integrated circuit of claim 3, rein the one or more internal magnetic shields each comprises thin magnetic material.

8. The vacuum integrated circuit of claim 3, wherein the one or more internal magnetic shields are provided with respective penetrations for purposes of improving vacuum conductance and providing pressure equalization, each penetration comprising:

a) a hollow tubular component comprising magnetic shielding material;

b) said hollow tubular component having an aspect ratio of its internal diameter to its length being one to four or greater;

c) said magnetic shielding material being insulated with a vacuum-grade refractory dielectric; and d) said hollow tubular component being electrically insulated in a contiguous fashion with said vacuum-grade refractory dielectric on said magnetic shielding material.

9. The vacuum integrated circuit of claim 4, wherein the one or more internal magnetic shields each comprises magnetic material in particulate form, which is dispersed in an associated electrically insulating material, and overcoated with a fully dielectric refractory layer.

10. The vacuum integrated circuit of claim 1, wherein the vacuum enclosure includes one or more internal chemical getter pumps.

* * * * *